(No Model.)
S. R. MILLER.
DEVICE FOR CHALKING LINES.
No. 520,998. Patented June 5, 1894.
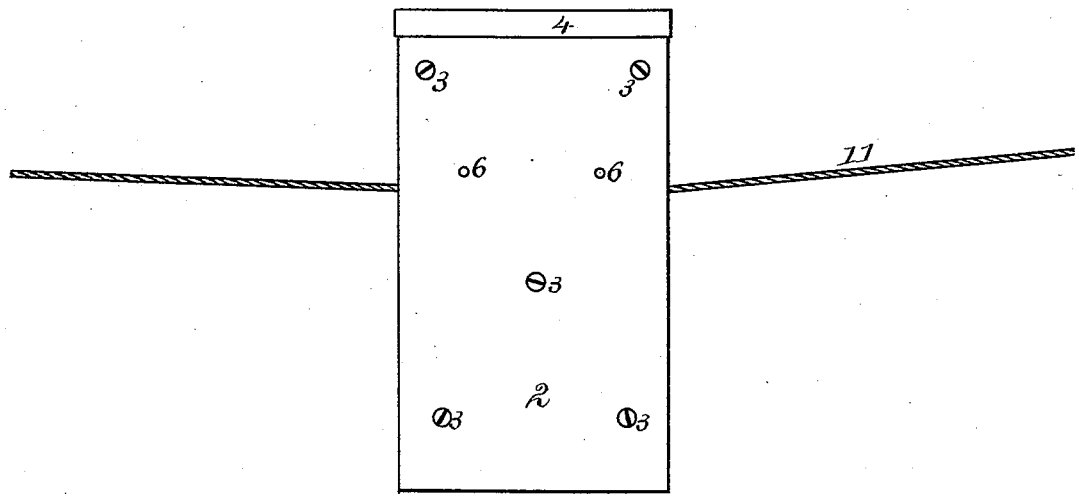
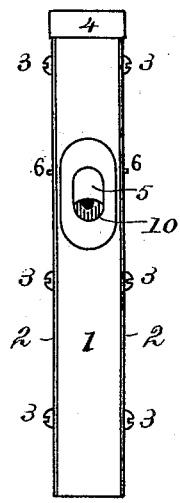
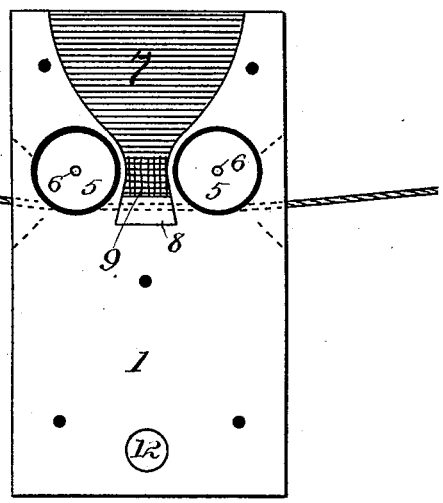
ATTEST
Helen Graham
William Graham
INVENTOR
SAMUEL R. MILLER.
by his attorney
L. P. Graham

UNITED STATES PATENT OFFICE.

SAMUEL R. MILLER, OF DECATUR, ILLINOIS.

DEVICE FOR CHALKING LINES.

SPECIFICATION forming part of Letters Patent No. 520,998, dated June 5, 1894.

Application filed October 16, 1893. Serial No. 488,222. (No model.)

*To all whom it may concern:*

Be it known that I, SAMUEL R. MILLER, of Decatur, in the county of Macon and State of Illinois, have invented certain new and useful Improvements in Devices for Chalking Lines, of which the following is a specification.

In making chalk marks to guide the laying of shingles, &c., it is customary to use a chalked line stretched from side to side of the roof. The line requires to be frequently rechalked and this has heretofore been done by drawing the chalk along the line by hand.

This invention is designed to travel from one end of the line to the other, chalking the line as it goes, and it is embodied in the details of construction and combinations of parts hereinafter set forth and claimed.

In the drawings forming part of this specification Figure 1 is a side elevation of the device as it appears when in use. Fig. 2 is an edge elevation of the same. Fig. 3 shows the device with a side plate removed to expose the interior, and Fig. 4 is an end view of the block that carries the feed agitators.

The block 1 is bored to receive pulleys 5, and slotted for the passage of the chalk line 11, as seen at 10 in Fig. 2. It is also cut away to form the chalk hopper 7, and to receive the transverse block 8. The plates 2 are secured to the sides of the main block 1 by means of screws 3, and they complete the hopper and provide bearings for the shafts or trunnions 6 of the rollers. The secondary block 8 is depressed, as shown in Fig. 4, to receive the line, and it is provided with bristles, or equivalent, placed at 9 adjacent to the line. The hopper is provided with a lid as 4, and weights may be set into the block, as indicated at 12 in Fig. 3, in order to keep the lower end properly suspended.

In operation the hopper is filled with pulverized chalk, and the device is caused to move from one end of the line to the other by forming a slight incline in the line to produce momentum, and then taking up the slack. The device will run rapidly down the incline and continue a considerable distance on the level after the line is tightened, and for unusually long lines a slight incline may be formed for the greater part of the length by raising the starting end sufficiently high. The motion of the chalker is back and forth alternately, being thrown in one direction at one chalking and back the next, and its use economizes time and saves the workmen the labor and, as it sometimes happens, the danger of scrambling back and forth over the roof. The bristles 9 are agitated slightly by contact with the line and the resulting motion prevents the chalk from choking in the throat of the hopper.

Having thus described my invention, I claim as new and desire to secure by Letters Patent—

1. A traveling chalker for chalk lines comprising a hopper apertured for the passage of the line, provided with carrying pulleys and weighted to maintain an upright position, substantially as set forth.

2. A traveling chalker for chalk lines consisting in the combination of the block 1, apertured to permit the passage of the line and cut away to form the hopper 7 and the recesses for the pulleys, the plates 2 secured to the sides of the block, and the pulleys 5 journaled in the plates and adapted to ride on the line, substantially as set forth.

3. A traveling chalker for chalk lines consisting in the combination of the block 1, apertured to permit the passage of the line and cut away to form the hopper 7 and the recesses for the pulleys, the plates 2 secured to the sides of the block, the pulleys 5 journaled in the plates and adapted to ride on the line, and the bristles or equivalent in the bottom of the hopper adjacent to the line, substantially as set forth.

In testimony whereof I sign my name in the presence of two subscribing witnesses.

SAMUEL R. MILLER.

Attest:
F. C. HARDY,
L. P. GRAHAM.